United States Patent [19]
Fiala

[11] 4,359,028
[45] Nov. 16, 1982

[54] APPARATUS FOR PROVIDING UNIFORM ACCELERATION FOR AN INTERNAL COMBUSTION ENGINE

[75] Inventor: Ernst Fiala, Wolfsburg, Fed. Rep. of Germany

[73] Assignee: Volkswagenwerk Aktiengesellschaft, Wolfsburg, Fed. Rep. of Germany

[21] Appl. No.: 163,492

[22] Filed: Jun. 27, 1980

[30] Foreign Application Priority Data

Jun. 28, 1979 [DE] Fed. Rep. of Germany ....... 2926105

[51] Int. Cl.³ ............................................. F02D 28/00
[52] U.S. Cl. .................................... 123/350; 123/396; 123/399; 74/860
[58] Field of Search ............... 123/361, 357, 352, 350, 123/396, 398, 399, 320, 438; 74/860

[56] References Cited

U.S. PATENT DOCUMENTS 3,744,346 7/1973 Miner et al. ........................ 123/438
3,916,854 11/1975 Barton et al. ...................... 123/363
4,245,599 1/1981 Des Lauriers ...................... 123/361

FOREIGN PATENT DOCUMENTS 60632 2/1943 Denmark ........................... 123/396
2328076 12/1973 Fed. Rep. of Germany ...... 123/396
691973 5/1953 United Kingdom ............... 74/860

OTHER PUBLICATIONS

"Digital Computer Fundamentals" (4th ed. 1977), by Thomas C. Bartee.

Primary Examiner—Charles J. Myhre
Assistant Examiner—Andrew M. Dolinar
Attorney, Agent, or Firm—Brumbaugh, Graves, Donohue & Raymond

[57] ABSTRACT

A control apparatus for controlling the fuel metering device of an internal combustion engine uses a computer and servomotor to override the accelerator when the engine reaches a predetermined threshold speed for a selected throttle valve position. Preset values stored in the computer assure favorable fuel consumption during acceleration above the threshold speed.

8 Claims, 3 Drawing Figures

APPARATUS FOR PROVIDING UNIFORM ACCELERATION FOR AN INTERNAL COMBUSTION ENGINE

BACKGROUND OF THE INVENTION

This invention concerns an arrangement for providing favorable fuel consumption during acceleration of a vehicle engine. An arrangement which achieves favorable fuel consumption is disclosed in U.S. Pat. No. 3,916,854. In this teaching, the engine accelerates in conformity with a predetermined favorable consumption curve in the power-speed diagram, independently of the instantaneous position of the accelerator pedal (hereinafter designated as accelerator pedal position), until the adjustment of the control means of the fuel metering device given by the accelerator pedal position is achieved. The control means might be the throttle valve in a carburetor or the control rod in a fuel injection pump. Then the actual consumption is predetermined by the curve of constant position of the control means (i.e. constant accelerator pedal position) in said diagram.

SUMMARY OF THE INVENTION

It is the purpose of this invention to create an arrangement provided with a computer for achieving a manner of operation for favorable fuel consumption. The arrangement in accordance with the invention differs from the prior art in that the computer controls acceleration at higher engine speeds than the speed related to the point of intersection between the curve of constant selected accelerator pedal position and the selected curve of favorable fuel consumption.

The operation of the invention is based on the principle that the operating points for the least fuel consumption lie in the vicinity of the full load curve of the power-speed diagram for internal combustion engines. Accordingly, during operation, all operating points at a distance from full load (high speed at low manifold vacuum pressure) are unfavorable as the engine must operate at an unnecessarily high rate of fuel consumption.

In accordance with the invention, power regulation is obtained in a manner whereby the operation of the engine is confined to a region in the vicinity of the full load curve. FIG. 1 illustrates the output of power (N)-speed (n)-diagram in which, in addition to the selected curve $b_1$ which is favorable for fuel consumption, lines $b_2 \ldots b_x$ represent various equal incremental positions of the control or regulating means, e.g., the accelerator pedal. Each of these curves of constant accelerator pedal position intersect with the curve $b_1$. Acceleration occurs along the curve representing the selected accelerator position until curve $b_1$ is reached, then along the part of curve $b_1$ extending above the point of intersection; operation never occurs in the zone to the right of the $b_1$ curve. From this it follows that even the smallest possible accelerator pedal position different from the idling position leads to full load (curve a) as the speed increases. If the output available to the driver is too large, he can either engage the nexthigher gear or he can move the accelerator pedal to its idling position.

In contrast thereto, in accordance with the aforementioned U.S. Patent, acceleration occurs initially on a curve which is favorable for fuel consumption until a particular setting of the throttle valve, predetermined by the accelerator pedal position, is achieved; thereafter acceleration proceeds along the curve of the selected constant throttle valve position, in the zone to the right of the favorable curve.

In one embodiment of the invention it is proposed to provide a depressable stop on the accelerator pedal for the position $b_x$, which corresponds to the points of minimal fuel consumption at a predetermined power output. At this stop, the output is obtained at optimal consumption conditions whereas on "kickdown," the maximum power becomes available.

In order to facilitate continuous travel at a constant speed in the highest gear, a speed governor may be provided for. Alternatively, means may be provided for switching to another characteristic curve for output control having fixed throttle valve or fuel metering device positions associated with the accelerator pedal positions.

For a better understanding of the present invention, together with other and further objects, reference is made to the following description, taken in conjunction with the accompany drawings, and its scope will be pointed out in the appended claims.

DETAILED DESCRIPTION OF THE PREFERRED EMBODIMENT

Figure 2:
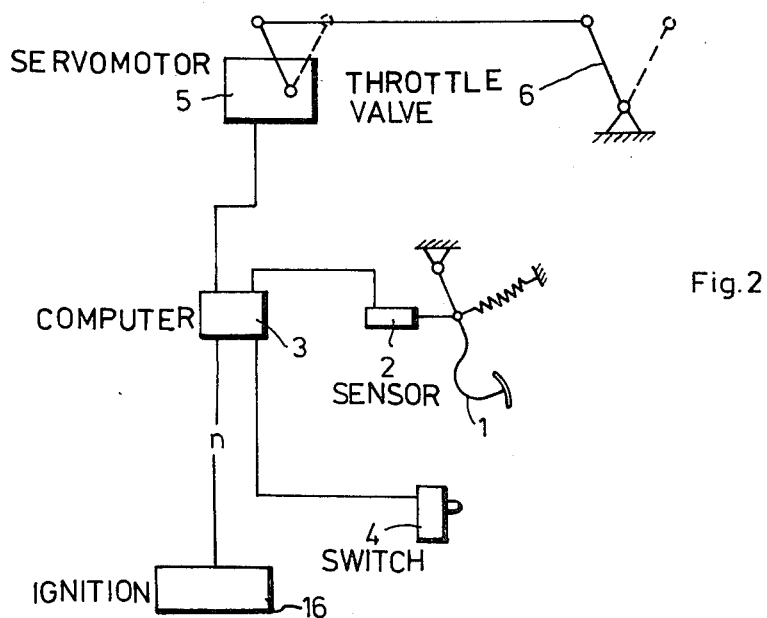
FIG. 2 illustrates an arrangement for providing fuel-efficient acceleration of an internal combustion engine.

In FIG. 2, the position of the accelerator pedal 1 is monitored by a sensor 2 and is delivered to a computer 3. The computer also receives a speed signal n from the ignition 16, the AC generator (not shown), or the like. A further input signal is received through the switch 4, which is closed when the highest gear is engaged, producing the interconnection (not shown) between the accelerator pedal position and the position of the fuel metering device, e.g., the throttle valve angle. Also not shown is the input for a speed or r.p.m. governor which brings about constant-speed or constant-revolutions regulation.

The present value signal for the throttle valve position is delivered from the computer 3 to the servomotor 5 for conversion to a mechanical position signal which in turn is transmitted to the throttle valve 6 (or the control rod of a fuel injection pump).

A manual switch for disconnecting the arrangement (not shown) may be provided serving to utilize the braking action of the engine during downhill travel.

Figure 1:
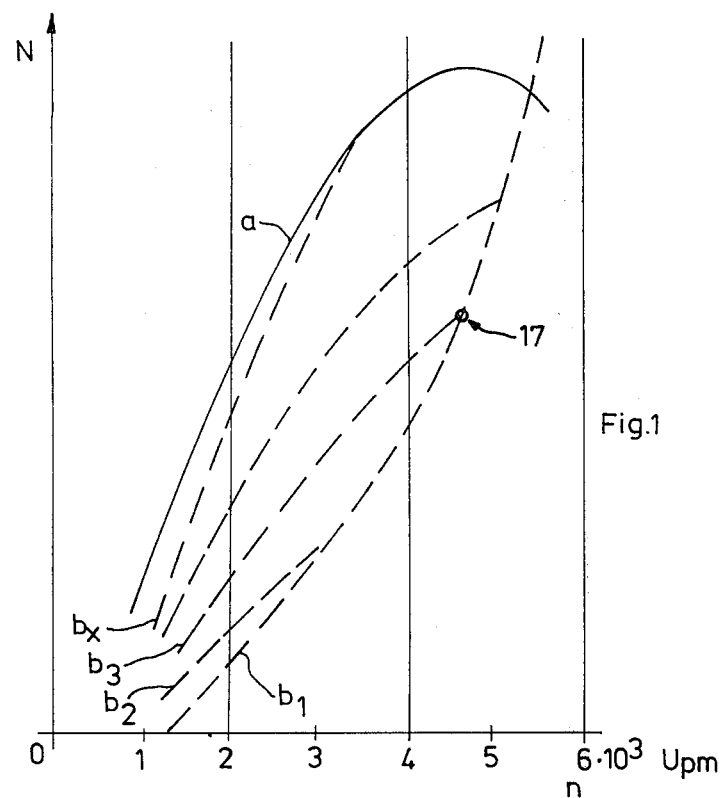
FIG. 1 is a power versus speed diagram for an internal combustion engine.
Figure 3:
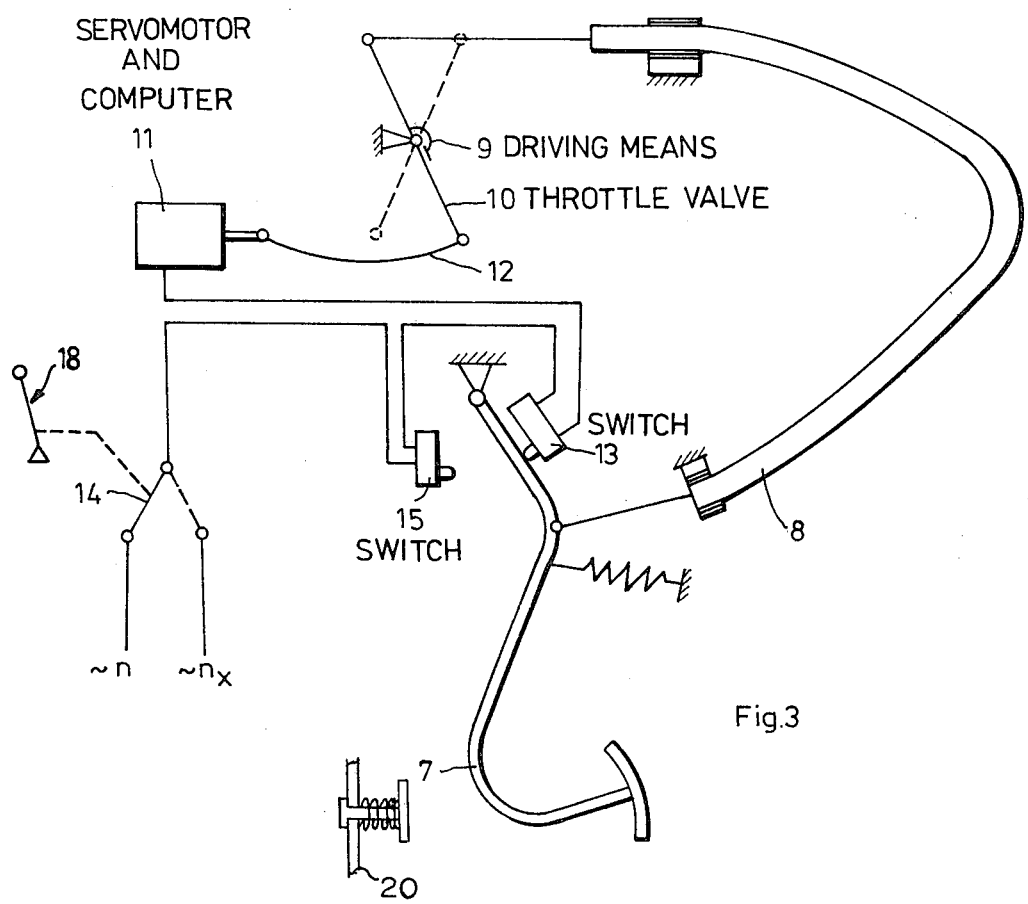
FIG. 3 illustrates an alternative arrangement for providing fuel-efficient acceleration of an internal combustion engine.

An alternative embodiment of the invention is shown in FIG. 3. The throttle valve 10 or a control rod is actuated by means of the accelerator pedal 7 via a cable 8 (such as a Bowden cable or rod mechanism) and the driving means 9. However, the servomotor 11, which is combined with the computer in this embodiment, operates the throttle valve 10 by means of a flexible cable 12. The servomotor 11 is supplied with a speed signal whenever the accelerator pedal 7 is not in the idling position, the latter being detected by means of a switch 13. The interrelationship of throttle valve angle and speed yields the curve $b_1$ in FIG. 1. In the highest gear, the servomotor can be disconnected by means of a switch (not shown) connected in series with the idling switch 13 a fixed depressable stop 20 associated with the accelerator pedal 7 indicates when the position $b_x$ in FIG. 1 is reached.

The arrangement operates as follows. The driver accelerates as usual with a medium accelerator position (e.g., curve $b_3$ in FIG. 1). At some value of engine speed where the curve $b_3$ intersects with the curve $b_1$ (at point 17 in FIG. 1), the computer-controlled servomotor 11 takes over control of the driving means 9. The accelerator pedal 7 "drops down" as the vehicle continues to accelerate. This causes the driver to shift to the next-higher gear maintaining operation in the zone of favorable consumption. Alternatively, the operator can release the accelerator pedal whereafter the idling switch 13 causes the servomotor 11 to displace the throttle valve 10 into its idling position.

In the highest gear, the switch 14 is actuated by the gear shift 18 (control) to select preset speed signal "$n_x$" which in fact corresponds to a predetermined position of the throttle valve 10.

In an emergency, it would be desirable to functionally disconnect the apparatus from the throttle valve. The kickdown switch 15, mounted on the accelerator pedal, serves to bypass the entire arrangement. When the accelerator pedal is fully depressed, the switch 15 is activated, disconnecting the computer 11 from the speed signal "n", whereby the throttle valve 10 is actuated according to the position of the accelerator pedal 7.

While there has been described what is believed to be the preferred embodiment of the invention, those skilled in the art will recognize that other and further modifications may be made thereto without departing from the spirit of the invention, and it is intended to claim all such embodiments as fall within the true scope of the invention.

I claim:

1. A control apparatus for providing favorable fuel consumption during operation of an internal combustion engine in response to operation of an accelerator pedal, said engine having a controllable fuel metering device, comprising:

servomotor means for actuating said fuel metering device;

first means for providing an output indicative of the position of said accelerator pedal;

second means for generating signals indicative of engine rotational speed; and means responsive to said pedal position and said engine speed signals for controlling the setting of said fuel metering device, said setting of said fuel metering device being dependent only on said pedal position in a first range of values for said speed signals, and said setting being dependent only on said speed signals in a second range of values for said speed signals, said second range higher than said first range.

2. A control apparatus as set forth in claim 1 wherein said accelerator pedal has a fixed depressable stop which corresponds to the setting of said metering device for minimum fuel consumption.

3. A control apparatus as set forth in claims 1 or 2 and used with a transmission with a highest gear wherein said pedal position and engine speed responsive means further includes a switch means, responsive to engagement of the highest gear of the transmission to cause said control apparatus to respond only to said accelerator pedal position.

4. A control apparatus as set forth in claim 3 wherein said first means comprises a cable and drive means, where said cable and drive means are connected between said accelerator pedal and said metering device.

5. A control apparatus as set forth in claim 4 wherein there is provided a kickdown switch associated with said accelerator pedal for disconnecting said pedal position and engine speed responsive means and providing direct operation of said fuel metering device according to the position of said accelerator pedal.

6. A control apparatus for providing favorable fuel consumption during operation of an internal combustion engine in response to operation of an accelerator pedal, said engine having a controllable fuel metering device, comprising:

servomotor means for actuating said fuel metering device;

first means for generating signals indicative of the position of said accelerator pedal;

second means for generating signals indicative of engine rotational speed; and means responsive to said pedal position signals and said engine speed signals for generating an output signal to actuate said servomotor means, said output signal having a value dependent only on said pedal position signals in a first range of values for said speed signals, and said output signals having a value dependent only on said speed signals in a second range of values for said speed signals, said second range higher than said first range.

7. The apparatus of claim 6 wherein said pedal position and engine speed responsive means includes a computer with stored settings for generating said output signal to said fuel metering device in said second range, said settings corresponding to low fuel consumption by said engine.

8. A control apparatus as set forth in claim 6 and used with a transmission with a highest gear wherein said pedal position and engine speed responsive means further includes a switch means, responsive to engagement of said highest gear of said transmission, to cause said control apparatus to respond only to said accelerator pedal position.

* * * * *